US006335760B1

(12) United States Patent
Sato

(10) Patent No.: US 6,335,760 B1
(45) Date of Patent: *Jan. 1, 2002

(54) IMAGE SIGNAL REPRODUCTION DEVICE

(75) Inventor: Koichi Sato, Tokyo (JP)

(73) Assignee: Asahi Kogaku Kogyo Kabsushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,560

(22) Filed: Mar. 24, 1998

(30) Foreign Application Priority Data

Mar. 27, 1997 (JP) .............................................. 9-092957

(51) Int. Cl.$^{7}$ .................................................. H04N 7/12

(52) U.S. Cl. ..................... 348/397.1; 348/443; 345/132

(58) Field of Search .......................... 386/109, 27, 405, 386/412, 409, 219, 322, 396, 112, 124; 348/397, 390, 405, 412, 409, 219, 322, 396, 124, 441, 443, 458, 554, 552; 358/300, 447; 345/132; 367/108; 382/240

(56) References Cited

U.S. PATENT DOCUMENTS 4,652,928 A * 3/1987 Endo et al. ................. 348/219
4,829,493 A * 5/1989 Bailey ........................ 367/108
4,857,992 A * 8/1989 Richards ..................... 348/397
5,122,873 A * 6/1992 Golin ......................... 348/390
5,315,670 A * 5/1994 Shapiro ...................... 382/240
5,321,776 A * 6/1994 Shapiro ...................... 382/240
5,666,209 A * 9/1997 Abe ........................... 348/397
5,689,612 A * 11/1997 Abe ........................... 348/397
5,841,552 A * 11/1998 Atobe et al. ................ 358/447

* cited by examiner

*Primary Examiner*—Chris Kelley
*Assistant Examiner*—Gims Philippe
(74) *Attorney, Agent, or Firm*—Greenblum & Bernstein, P.L.C.

(57) ABSTRACT

An image signal reproduction device, provided in an electronic still camera, comprises a CPU, an image signal processing circuit, a memory card, in which a compressed image signal is recorded, and a display device having a liquid crystal display (LCD) and a resolution recognition unit. A clock pulse, outputted from the CPU, is received by the resolution recognition unit, so that a recognition pulse, corresponding to the inherent resolution of the LCD, is outputted from the resolution recognition unit to the image signal processing circuit. The compressed image signal is read from the memory card, and reproduced to some extent corresponding to the resolution of the LCD.

22 Claims, 12 Drawing Sheets

FIG. 13

| NUMBER OF PIXELS IN THINNING | NUMBER OF SCANS | | RESOLUTION |
|---|---|---|---|
| 7 | N1 | ↔ | CORRESPONDING TO TYPE D |
| 3 | N2 | ↔ | CORRESPONDING TO TYPE C |
| 1 | N3 | ↔ | CORRESPONDING TO TYPE B |
| 0 | N4 | ↔ | CORRESPONDING TO TYPE A |

$N1 < N2 < N3 < N4$

SCAN (1)

SCAN (2)

SCAN (X)

IMAGE SIGNAL REPRODUCTION DEVICE

BACKGROUND OF THE INVENTION

1. Field of the Invention

The present invention relates to an image reproduction device, which, based on an image signal outputted by a CCD, for example, reproduces and indicates an image on a display.

2. Description of the Related Art

Recently, an electronic camera, in which a CCD is mounted, has been developed. An image signal obtained by the electronic camera is usually compressed and recorded as image data on a recording medium. The compressed image signal is read from the recording medium, and then expanded or reproduced. The reproduced image signal is converted to a predetermined format, so that the image is indicated by an indicating device, such as a display.

In an image reproduction device, which reproduces an image from image data of a compressed image signal, a progressive method is utilized in which, after a rough image having a low resolution or gradation is reproduced, the resolution or gradation is gradually increased to a final resolution or gradation. Due to this method, when image data of a specified image is retrieved from an image data base, for example, the contents of the image can be recognized at an early stage since a rough image is indicated by a display.

However, if a full resolution of the image is greater than an indicating performance of the display, thus restricting the complete indication of the image, unnecessary image reproduction processing time is utilized in generating the full resolution image.

SUMMARY OF THE INVENTION

Therefore, an object of the invention is to provide an image reproduction device in which a resolution or gradation of an image can be changed in accordance with an indicating performance of a display.

According to the present invention, there is provided an image signal reproduction device comprising an image signal expansion processor, a display and a resolution setting processor.

The image signal expansion processor expands a compressed image signal to reproduce an image with a predetermined resolution. The display, which indicates the image, includes an inherent resolution which is a maximum permissible resolution. The resolution setting processor sets the predetermined resolution, which is incremented from a lower resolution to a higher resolution. The predetermined resolution set by the resolution setting processor is lower than or equal to the inherent resolution.

Further, according to the present invention, there is provided an image signal reproduction device comprising an image signal expansion processor for expanding a compressed image signal to reproduce an image with a predetermined resolution, a resolution setting processor incrementally setting the predetermined resolution to be lower than or equal to a maximum permissible resolution, and a display indicating the image, the display including an inherent resolution equal to the maximum permissible resolution.

Furthermore, according to the present invention, there is provided an image signal reproduction device comprising an image signal expansion processor, a display and a gradation setting processor.

The image signal expansion processor expands a compressed image signal to reproduce an image with a predetermined gradation. The display, which indicates the image, includes an inherent gradation which is a maximum permissible gradation. The gradation setting processor sets the predetermined gradation, which is incremented from a lower gradation to a higher gradation. The predetermined gradation set by the gradation setting processor is lower than or equal to the inherent gradation.

Further, according to the present invention, there is provided an image signal reproduction device comprising an image signal expansion processor for expanding a compressed image signal to reproduce an image with a predetermined gradation, a gradation setting processor incrementally setting the predetermined gradation to be lower than or equal to a maximum permissible gradation, and a display indicating the image, the display including an inherent gradation equal to the maximum permissible gradation.

Still further, according to the present invention, there is provided an image signal reproduction device comprising a display indicating an image, which is obtained by expanding a compressed image signal stepwisely from a lower resolution to a higher resolution, a resolution information outputting processor, a resolution selecting processor and an image signal expansion processor.

The resolution information outputting processor outputs resolution information which corresponds to resolutions of the image which can be indicated by the display. The resolution selecting processor selects one of the resolutions based on the resolution information. The image signal expansion processor expands the compressed image signal, and changes the amount of the compressed image signal, which is to be expanded, in accordance with the selected resolution.

Further, according to the present invention, there is provided an image signal reproduction device comprising a display indicating an image, which is obtained by expanding a compressed image signal stepwisely from a lower gradation to a higher gradation, a gradation information outputting processor, a gradation selecting processor and an image signal expansion processor.

The gradation information outputting processor outputs gradation information which corresponds to gradations of the image which can be indicated by the display. The gradation selecting processor selects one of the gradations based on the gradation information. The image signal expansion processor expands the compressed image signal, and changes the amount of the compressed image signal, which is to be expanded, in accordance with the selected gradation.

BRIEF DESCRIPTION OF THE DRAWINGS

The present invention will be better understood from the description of the preferred embodiments of the invention set forth below, together with the accompanying drawings, in which:

FIG. 13 is a view showing a relationship between Number of Scans and a resolution of a reproduced image;

DESCRIPTION OF THE PREFERRED EMBODIMENTS

Figure 1:
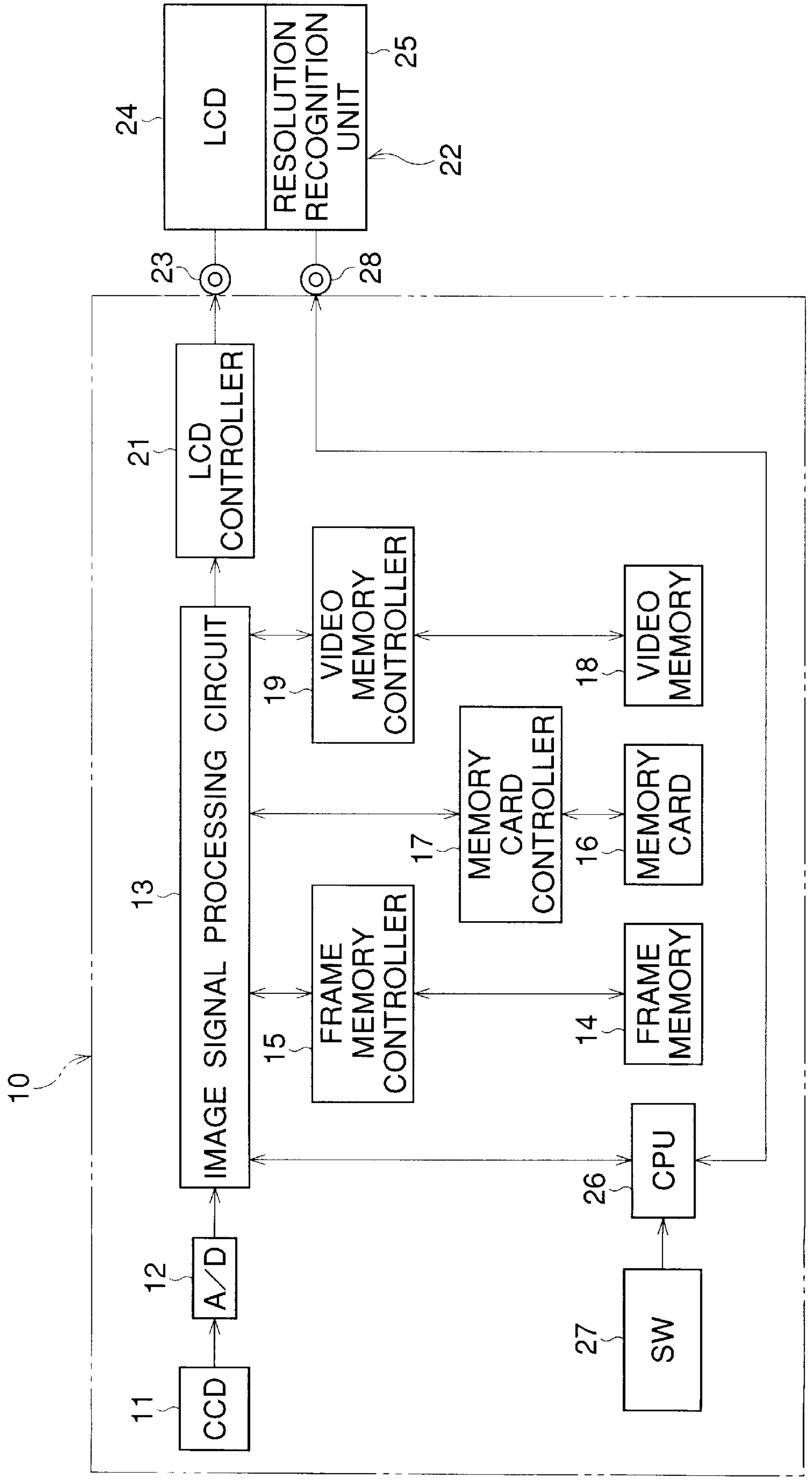
FIG. 1 is a block diagram showing an electronic still camera having an image reproduction device to which a first embodiment of the present invention is applied.

The present invention will be described below with reference to embodiments shown in the drawings.

FIG. 1 shows a block diagram of an electronic still camera 10 having an image reproduction device to which a first embodiment of the present invention is applied.

In the electronic still camera 10, an optical image obtained by a photographing optical system (not shown) is formed on a light receiving surface of a CCD (charge coupled device) 11, so that the optical image is photoelectrically-converted to an electric charge signal by the CCD 11. The electric charge signal, which is an analog image signal, having been outputted from the CCD 11, is converted by an A/D converter 12 to a digital image signal.

An image signal processing circuit 13 is provided for subjecting the digital image signal to various kinds of image processing. A frame memory 14, provided for storing the digital image signal, is connected to a frame memory controller 15, which is connected to the image signal processing circuit 13. The digital image signal outputted from the A/D converter 12 is temporarily stored in the frame memory 14, through the frame memory controller 15, and is subsequently read from the frame memory 14, to be compressed by the image signal processing circuit 13.

A memory card 16 is provided for storing the compressed image signal as image data. The memory card 16 is connected to a memory card controller 17, which is connected to the image signal processing circuit 13. The image data are processed by the memory card controller 17, so that the image data are converted to a predetermined format for the memory card 16. Note that the memory card 16 can be detached from the electronic still camera 10.

The image data stored in the memory card 16 are read therefrom, through the memory card controller 17, and are expanded by the image signal processing circuit 13. The expanded image data are stored in the frame memory 14. Then, the expanded image data are read from the frame memory 14, so that an image signal for monitoring is generated by the image signal processing circuit 13 in accordance with the expanded image data. The image signal for monitoring is stored in a video memory 18.

The video memory 18 is connected to a video memory controller 19, which is connected to the image signal processing circuit 13. Thus, the image signal is stored in and read from the video memory 18, through the video memory controller 19. The image signal read from the video memory 18 is inputted into an LCD controller 21, in which a synchronization signal is added to and an image signal processing, such as a gamma correction, is performed on the image signal, so that a video image signal is generated. The video image signal is then inputted into a display device 22 via an input terminal 23 provided in the display device 22.

The display device 22 includes a liquid crystal display (LCD) 24 and a resolution recognition unit 25, which is provided for recognizing an inherent resolution of the LCD 24. The inherent resolution is a maximum permissible resolution of the LCD 24.

An operation of the electronic still camera 10 is controlled by a microcomputer (CPU) 26. A switch 27 is connected to the CPU 26 so that an operation of the electronic still camera 10 is controlled. The image signal processing circuit 13 is operated in accordance with a command signal outputted by the CPU 26, and information regarding the image signal is transferred between the image signal processing circuit 13 and the CPU 26. The CPU 26 is connected to the resolution recognition unit 25 via an input-output terminal 28 provided in the display device 22, so that information regarding the resolution of the LCD 24 is transferred between the CPU 26 and the resolution recognition unit 25.

The image compression process performed in the image signal processing circuit 13 is described below with reference to FIG. 2.

An image of one frame F1 has 1280×960 pixels, for example, and is divided into a plurality of pixel blocks F2, each of which is composed of 8×8 pixels. A pixel value $a_k$ ($1 \leqq k \leqq 64$) in the pixel block F2 corresponds to a luminance value or a color differential data of the pixel, and is a positive integer.

A discrete cosine transformation (DCT) or an orthogonal transformation is carried out for each pixel block F2, so that an image corresponding to the pixel block F2 is broken down into a plurality of spatial frequency components, and thus, DCT coefficients $b_k$ are obtained. The greater the suffix "k", the higher the spatial frequency. The DCT coefficients $b_k$ are arranged in a zigzag order, in a coefficient block F3, in such a manner that DCT coefficients corresponding to the lower spatial frequencies are located towards a top-left of the coefficient block F3, and DCT coefficients corresponding to the higher spatial frequencies are located towards a bottom-right of the coefficient block F3.

The DCT coefficients $b_k$ are positive integers, and each of the DCT coefficients $b_k$ is quantized by using a quantization table Q, containing 64 quantization coefficients, so that quantized DCT coefficients $c_k$ are obtained, as shown by the reference F4. Usually, quantized DCT coefficients $c_k$ corresponding to the lower spatial frequencies possess some values other than 0. whereas some quantized DCT coefficients $c_k$ corresponding to the higher spatial frequencies are 0.

The quantized DCT coefficients $c_k$ included in the block F4 are divided into a plurality of groups G1, G2, G3 and G4, in accordance with the spatial frequencies. The first group G1 contains the quantized DCT coefficients $c_k$ of the lowest spatial frequencies, and the spatial frequencies increase in order of the second, third and fourth groups G2, G3 and G4.

The quantized DCT coefficients $c_k$, for each of the groups G1, G2, G3 and G4, are encoded, thus generating encoded image data for each of the groups G1, G2, G3 and G4, which are then recorded, with a predetermined format, in the memory card 16. Thus, in this embodiment, a spectral selection system (i.e. s—s system), in which quantized DCT coefficients are encoded for every group, is utilized.

Figure 3:
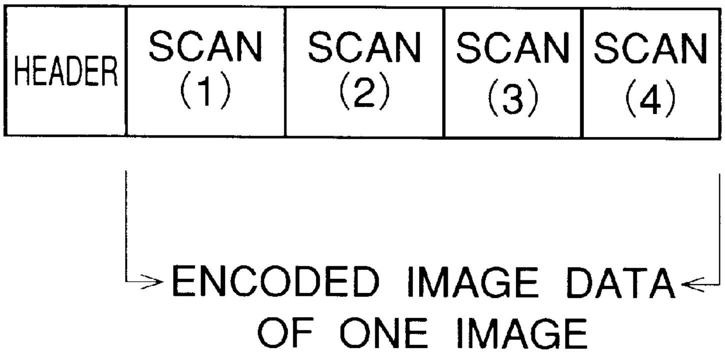
FIG. 3 is a view showing a format with which encoded image data are recorded in a memory card.

FIG. 3 shows the format with which the encoded image data are recorded in the memory card 16. Each of the Scans corresponds to encoded image data obtained by encoding quantized DCT coefficients, included in each of the groups G1, G2, G3 and G4. Scan (1) includes the encoded image data of the group G1, the quantized DCT coefficients corresponding to the lowest spatial frequencies, and Scan (4) includes the encoded image data of the group G4, the quantized DCT coefficients corresponding to the highest spatial frequencies. A header is provided at a top portion of the encoded image data, enabling storage of various parameters.

Figure 8:
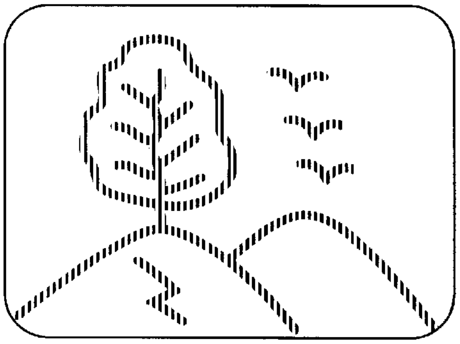
FIG. 8 is a view showing an image indicated by an LCD, when only the image signal corresponding to the image data of Scan (1) is reproduced.
Figure 9:
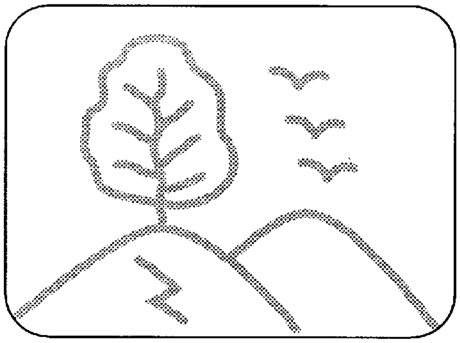
FIG. 9 is a view showing an image indicated by the LCD when the image signal corresponding to the image data of Scans (1) and (2) is reproduced.
Figure 10:
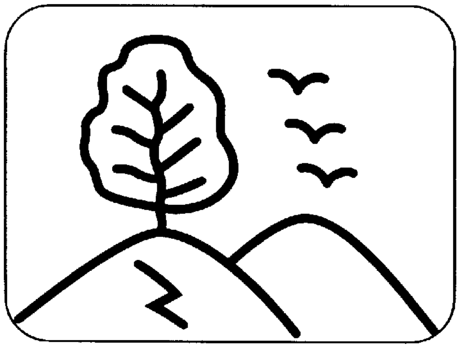
FIG. 10 is a view showing an image indicated by the LCD, when the image signal corresponding to the image data of all of the Scans is reproduced.

The image expansion process, performed in the image signal processing circuit 13, is described below with reference to FIGS. 4 through 10. FIGS. 4 through 7 schematically show image data, and FIGS. 8 through 10 show images displayed by the LCD 24 (see FIG. 1) during the expansion process.

Figure 4:
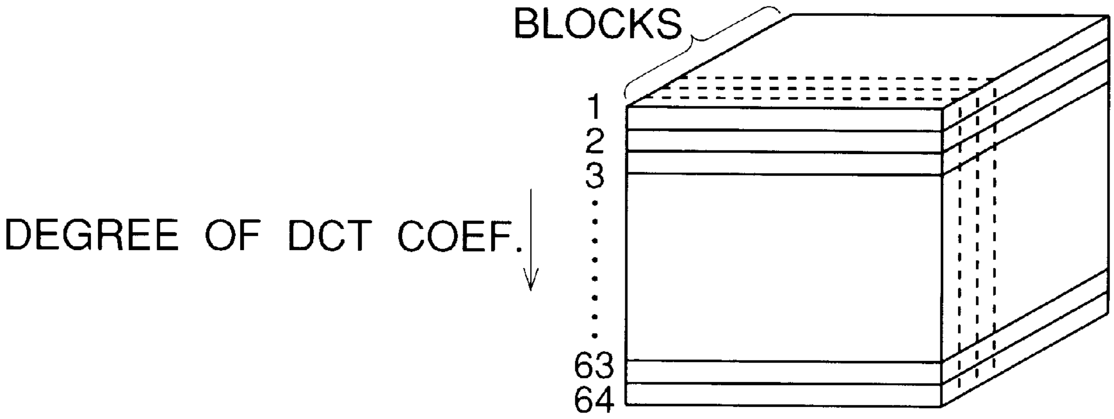
FIG. 4 is a view schematically showing image data contained in all of the Scans.
Figure 5:
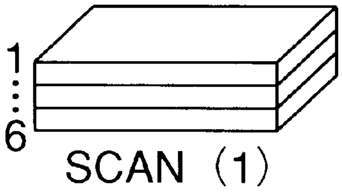
FIG. 5 is a view schematically showing image data contained in Scan (1)
Figure 6:
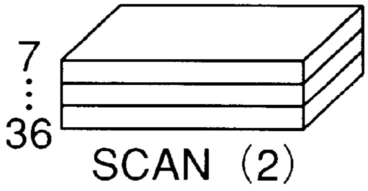
FIG. 6 is a view schematically showing image data contained in Scan (2)
Figure 7:
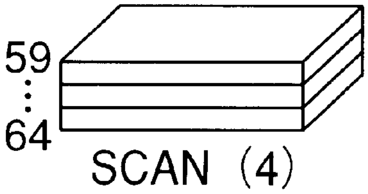
FIG. 7 is a view schematically showing image data contained in Scan (4)

As shown in FIG. 4, the image data of one frame (reference F1 in FIG. 2), divided, for example, into 8×8 pixel blocks, can be represented by, in this case, 64 spatial frequencies, following the determination of the DCT coefficients of the image data contained in each of the blocks. A degree of 1 corresponds to the lowest spatial frequency component of the DCT coefficients, which includes the quantized DCT coefficient $c_1$ (FIG. 2). A degree of 2 corresponds to the second lowest spatial frequency component, which includes the quantized DCT coefficient $c_2$. A degree of 3 corresponds to the third lowest spatial frequency component, which includes the quantized DCT coefficient $C_3$. A degree of 64 corresponds to the highest spatial frequency component, which includes the quantized DCT coefficient $c_{64}$.

Initially, the encoded image data of Scan (1), which are obtained by encoding the quantized DCT coefficients of the degrees 1 through 6, are read from the memory card 16. Then, the image data corresponding to Scan (1) are expanded, and stored in the frame memory 14. The expanded image data, for each of the blocks, are successively read from the frame memory 14, and are processed by the image processing circuit 13 to reproduce an image signal, thus enabling an image, which has a lower resolution as shown in FIG. 8, to be indicated on the LCD 24.

Then, the encoded image data of Scan (2), which are obtained by encoding the quantized DCT coefficients of degrees 7 through 36. are read from the memory card 16. The image data corresponding to Scan (2) are expanded, and also stored in the frame memory 14. The expanded image data corresponding to Scans (1) and (2), for each of the blocks, are read successively from the frame memory 14, and are processed by the image processing circuit 13 to reproduce an image signal, enabling an image, which has a higher resolution than that shown in FIG. 8, to be indicated on the LCD 24, as shown in FIG. 9.

Thus, when the image data corresponding to Scans (1), (2), (3) and (4) are reproduced for each of the blocks, an image, which has the highest resolution, is displayed on the LCD 24, as shown in FIG. 10.

In an expansion system described above, in which an image having a lower resolution is first reproduced and then the resolution is gradually increased, the expansion process may be performed more than is necessary, when the resolution of the LCD 24 (e.g. 640×480 pixels) is lower than that of the fully reproduced image signal (e.g. 1280×960 pixels), stored in the frame memory 14. Namely, the expansion process becomes inefficient in terms of time and power consumption.

In this embodiment, the display device 22 has the resolution recognition unit 25, so that the inherent resolution of the LCD 24 can be recognized by the CPU 26, and thus an inefficient use of the expansion process is prevented.

Figure 11:
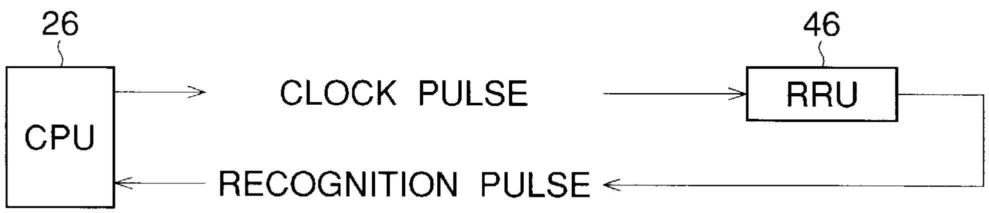
FIG. 11 is a view showing an operation of a CPU and a resolution recognition unit.

With reference to FIG. 11, an operation of the resolution recognition unit 25 is described below.

The resolution recognition unit 25 comprises a counter, to which clock pulses are inputted from the CPU 26. Every time a predetermined number of clock pulses is received by the resolution recognition unit 25, which performs a counting routine, a recognition pulse is outputted therefrom. The predetermined number of clock pulses is referred to as a count number hereinafter, being set in accordance with the performance (i.e. the inherent resolution) of the LCD 24 (see FIG. 1).

Figure 12:
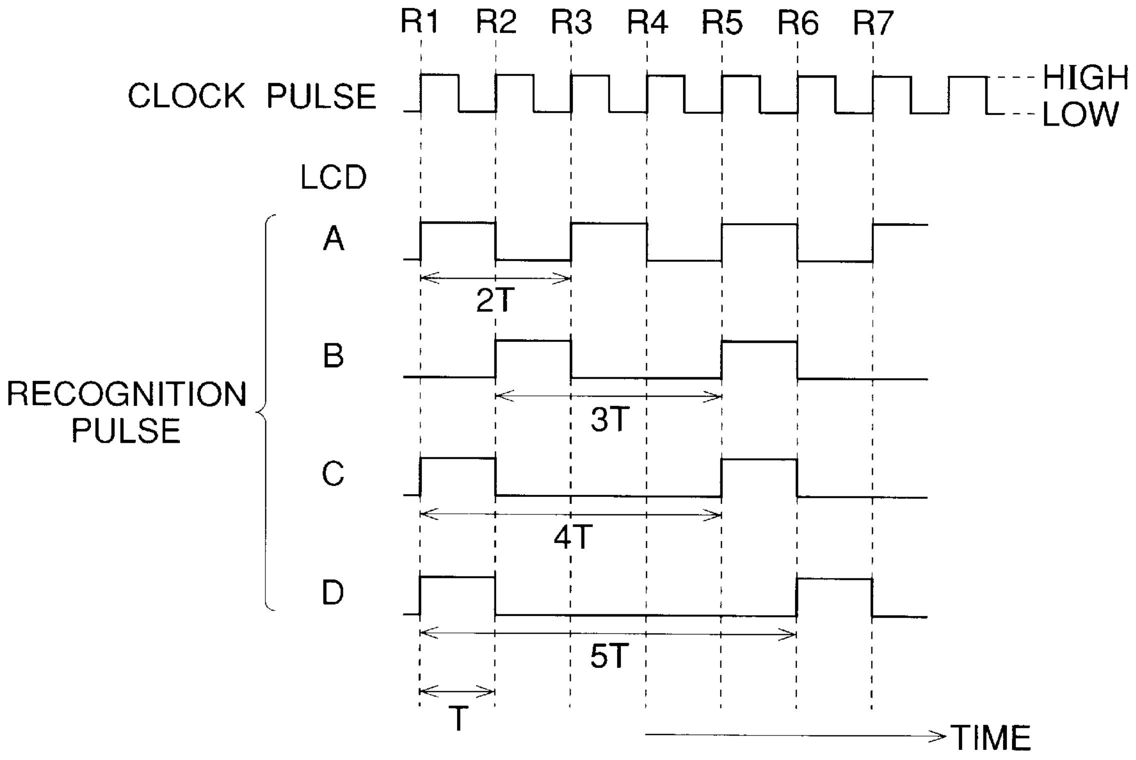
FIG. 12 is a timing chart showing clock pulses and recognition pulses.

FIG. 12 is a timing chart, showing the clock pulse, the recognition pulse, and time, which elapses from left to right. The clock pulse is continuously changed between a high level and a low level with a constant period. The resolution recognition unit 25 is operated in accordance with a rise of the clock pulse, i.e. when the clock pulse becomes high. The rise is indicated by references R1, R2 . . . R7, in FIG. 12. Note that a period from a rise of the clock pulse to a next rise of the clock pulse is defined as the pulse spacing, T.

The count number is set in such a manner that, when the LCD 24 has the inherent resolution of 1280×960 pixels, i.e. when the LCD 24 is of a type A, the recognition pulse has a pulse spacing of 2T.

When the LCD 24 has the inherent resolution of 640×480 pixels, i.e. when the LCD 24 is of a type B, the period of the recognition pulse is 3T. When the LCD 24 has the inherent resolution of 320×240 pixels, i.e. when the LCD 24 is of a type C, the period of the recognition pulse is 4T. When the LCD 24 has the inherent resolution of 160×120 pixels, i.e. when the LCD 24 is of a type D, the period of the recognition pulse is 5T.

Thus, the resolution recognition unit 25 outputs the recognition pulse, which has a predetermined period corresponding to the inherent resolution, when the clock pulse is inputted therein. The recognition pulse is inputted into the CPU 26, enabling the type of the LCD 24, i.e. the inherent resolution of the LCD 24, to be recognized. Therefore, a reproduction of the image can be performed by the image signal processing circuit 13 (see FIG. 1), in accordance with the inherent resolution of the LCD 24.

FIG. 13 shows a relationship between Number of Scans and the resolution of the reproduced image. The number of Scans (Scan (1), Scan (2), Scan (3), Scan (4)) to be reproduced and stored in the frame memory 14 (see FIG. 1) is determined in accordance with the inherent resolution of the LCD 24. In the case of the LCD 24 being of type D, which has the lowest inherent resolution, Number of Scans is N1, which is the least number of Scans (only Scan (1)) to be reproduced. Number of Scans increases in order of N1, N2, N3 and N4, as the inherent resolution of the LCD 24 becomes higher. Namely, Number of Scans N4 corresponds to the greatest number of reproduced Scans, in the case of the LCD 24 being of type A. The capacity of the frame memory 14 is larger than or equal to the amount corresponding to N4.

When the image signal, stored in the frame memory 14, is read therefrom and then stored in the video memory 18 (see FIG. 1), some pixel signals are thinned or disregarded from the image signal, in accordance with the inherent resolution of the LCD 24, except when the inherent resolution has a value greater than a predetermined value. In the context of this specification, "thinning" is a process of reading only every [thinning number +1]th pixel, i.e., the thinning number is the number of skipped or disregarded pixels (per pixel read). The number of thinned pixels becomes greater as the inherent resolution becomes lower. Namely, in the case of the LCD 24 being of type D (160×120 pixels), pixel signals are only stored in the video memory 18 on every eighth pixel (i.e. an eight pixel separation in both the horizontal and vertical directions of the image), so that an image having a satisfactory number of pixels, which conforms to the inherent resolution of the L.CD 24, is generated, and subsequently indicated by the LCD 24, while the expanded image data, stored in the frame memory 14, maintains the resolution of the original image signal, i.e., in this case, 1280×960 pixels. The reason is as follows: Since the inherent resolution of the LCD 24 is 160 ×120 pixels, only ⅛ of the pixels in both the horizontal direction and the vertical direction of the original 1280×960 pixel image (FIG. 2, F1) can be indicated by the LCD 24.

Figure 14A:
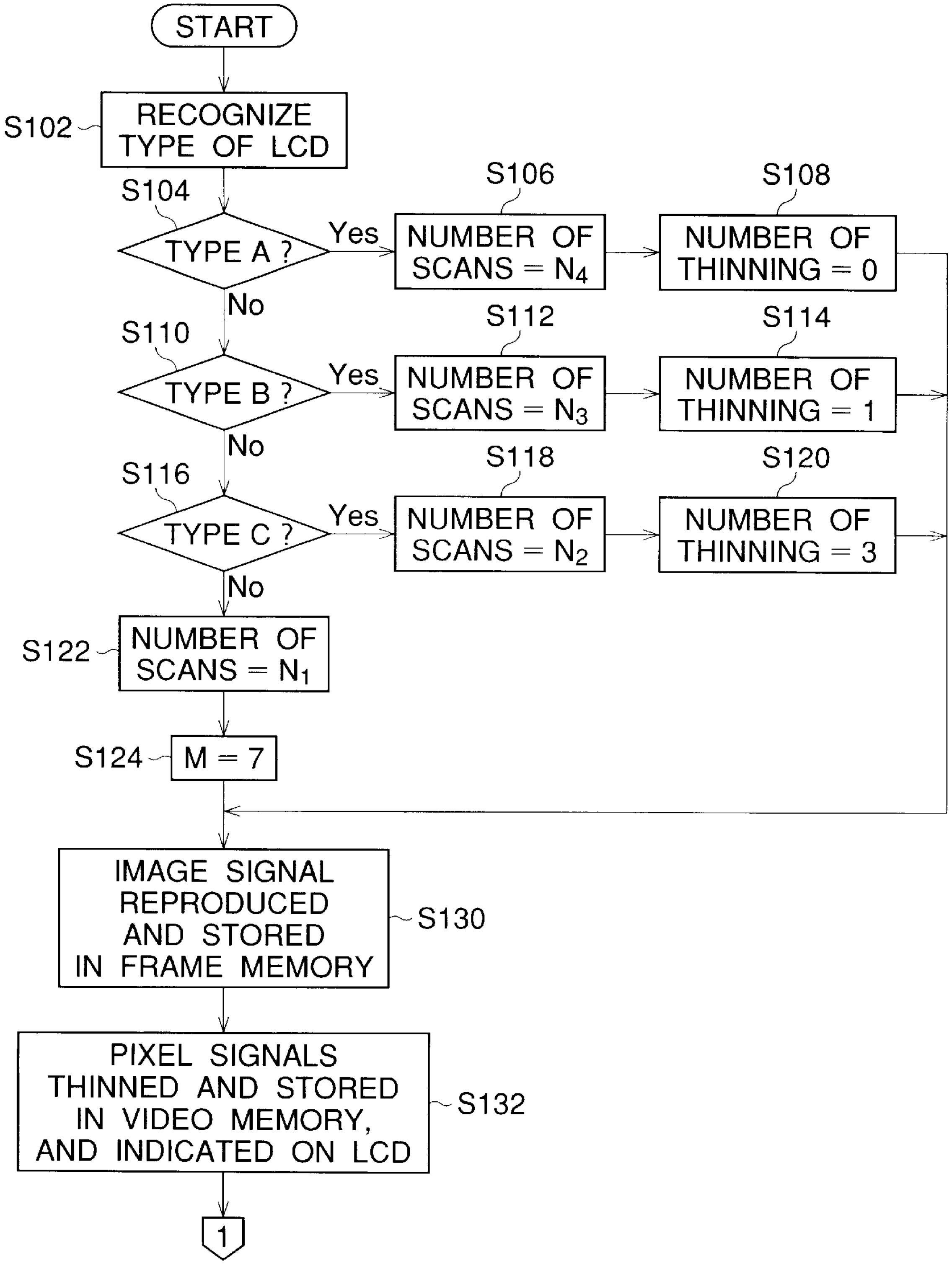
FIGS. 14A and 14B represent a flow chart of an image indicating process by which an image is indicated by the LCD.
Figure 14B:
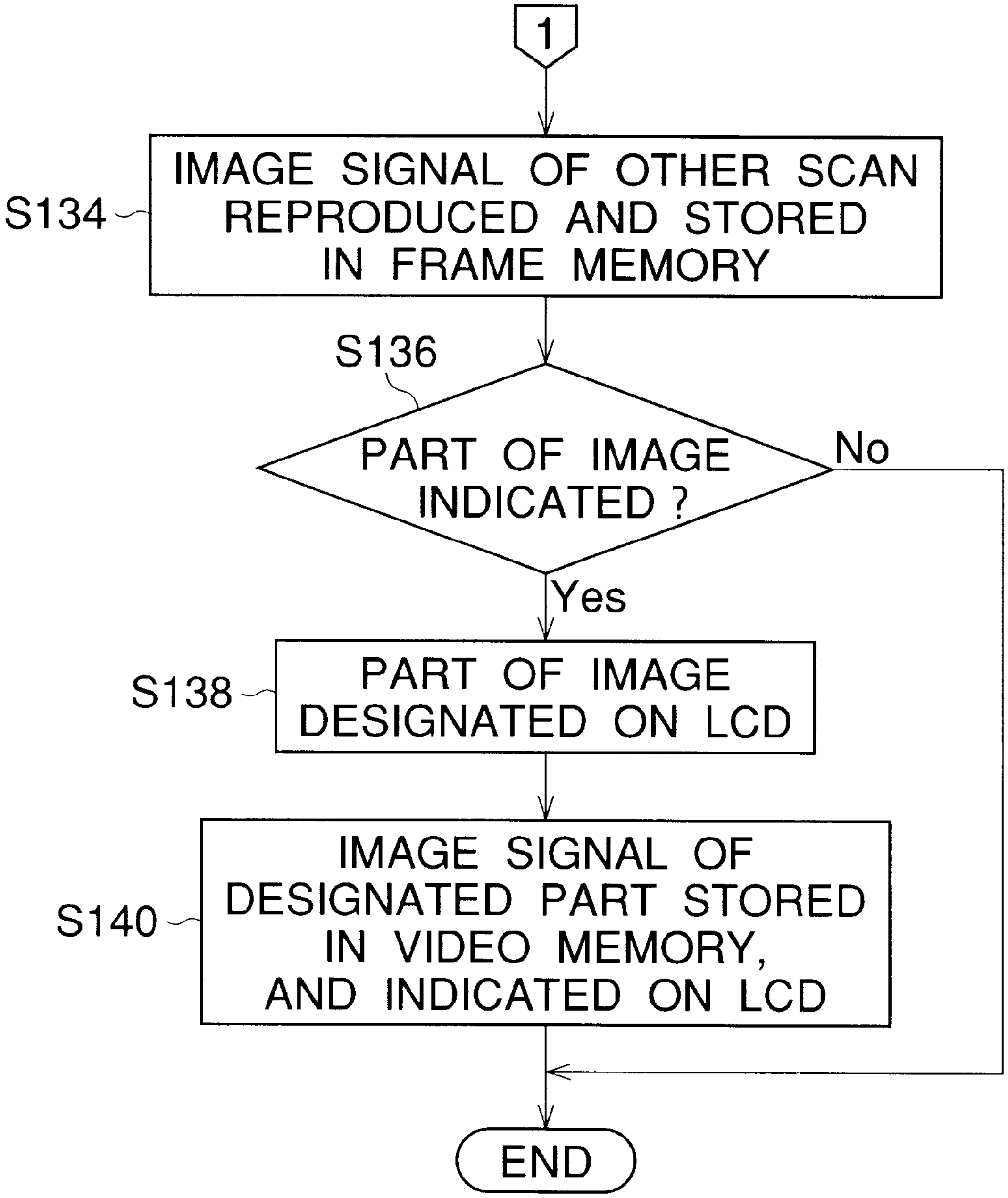

FIGS. 14A and 14B show a flow chart of an image indicating process by which an image is indicated by the LCD 24. With reference to FIGS. 1, 14A and 14B, the image indicating process is described.

In Step S102, the clock pulses are outputted from the CPU 26 and inputted to the resolution recognition unit 25, in which the type of LCD 24 is determined, based on the recognition pulse outputted by the resolution recognition unit 25. For example, when the recognition pulse has a pulse spacing of 4T, it is judged that the LCD 24 is of type C.

In Step S104, it is determined whether or not the LCD 24 is of type A. When the LCD 24 is of type A, Step S106 is executed in which Number of Scans is set to N4, and Step S108 is executed in which the thinning number is set to 0. Then, the process proceeds to Step S130.

Conversely, when it is determined in Step S104 that the LCD 24 is not of type A, Step S110 is executed. It is determined in Step S110 whether or not the LCD 24 is of type B. When the LCD 24 is of type B, Number of Scans is set to N3 in Step S112, and the thinning number is set to 1 in Step S114. Then, Step S130 follows.

When it is determined in Step S110 that the LCD 24 is not of type B, the process goes to Step S116, in which it is determined whether or not the LCD 24 is of type C. When the LCD 24 is of type C, Number of Scans is set to N2 in Step S118, and the thinning number is set to 3 in Step S120. Then, the process goes to Step S130.

On the other hand, when it is determined in Step S116 that the LCD 24 is not of type C, the LCD 24 should be of type D. Therefore, Number of Scans is set to N1 in Step S122, and the thinning number is set to 7 in Step S124. Then, Step S130 is executed.

After Number of Scans (N1, N2, N3, N4) and the thinning are set in accordance with the type of the LCD 24, Steps S130 and S132 are repeatedly executed in accordance with Number of Scans, i.e. the type of the LCD 24.

Initially, Step S130 is executed in which the compressed image signal, stored in the memory card 16 as image data, is expanded, based on Scan (1), to produce expanded image data, corresponding to the original image signal with a predetermined resolution, which is then stored in the frame memory 14. In Step S132, pixel signals, included in the expanded image data now stored in the frame memory 14, are thinned both in a horizontal direction and a vertical direction, in accordance with the thinning number corresponding to the LCD 24, and the thinned lowered resolution reproduced image signal is then stored in the video memory 18, so that an image is indicated on the LCD 24 in accordance with the pixel signals stored in the video memory 18.

Figure 2:
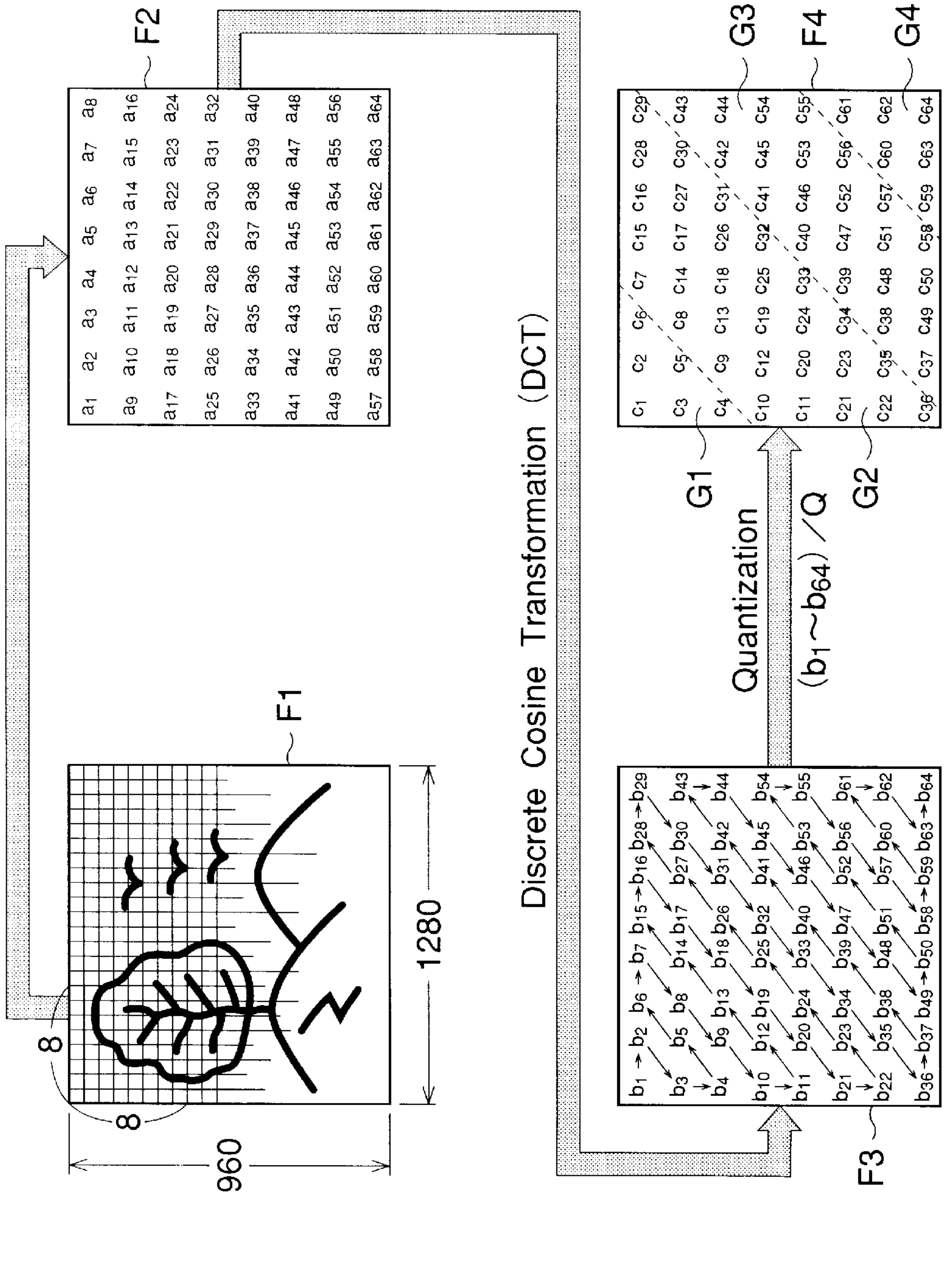
FIG. 2 is a view schematically showing an image compression process.

Subsequently, in Step S130, if Number of Scans is greater than N1, i.e. if the LCD 24 is a type other than type D, then the image data of Scan (2), corresponding to G2 of F4 in FIG. 2, are expanded and stored, along with the expanded image data of Scan (1) (previously expanded in N1), in the frame memory 14. Thus, in Step S132, the expanded image data of Scan (1) and Scan (2), corresponding to Number of Scans N2, are combined, thinned, in accordance with the thinning number corresponding to the LCD 24, and stored in the video memory 18, so that a slightly enhanced image is indicated on the LCD 24, in accordance with the thinned lowered resolution reproduced image signal stored in the video memory 18.

Further, in Step S130, if Number of Scans is greater than N2, i.e. if the LCD 24 is type B or type A, then the image data of Scan (3), corresponding to G3 of F4 in FIG. 2, are expanded and stored, along with the expanded image data of Scan (1) (previously expanded in N1) and the expanded image data of Scan (2) (previously expanded in N2), in the frame memory 14. Thus, in Step S132, the expanded image data of Scan (1), Scan (2) and Scan (3), corresponding to Number of Scans N3, are combined, thinned, in accordance with the thinning number corresponding to the LCD 24, and stored in the video memory 18, so that a further enhanced image is displayed at the LCD 24, in accordance with the thinned lowered resolution reproduced image signal stored in the video memory 18.

In Step S130, if Number of Scans is greater than N3, i.e. if the LCD 24 is type A, then the image data of Scan (4), corresponding to G4 of F4 in FIG. 2, are expanded and stored, along with the previously expanded and stored image data of Scan (1), Scan (2) and Scan (3), in the frame memory 14. Thus, in Step S132, the expanded image data of Scan (1), Scan (2), Scan (3) and Scan (4), corresponding to Number of Scans N4, are combined and stored in the video memory 18, so that a full resolution image, being equal to the maximum resolution of the type A display, is indicated on the LCD 24.

Therefore, this method permits an original high resolution image to be efficiently indicated on a variety of displays, of varying inherent resolutions, and provides a "quick-search" option in accessing a specific image from a plurality of stored images.

In Step S134, if the original image has a higher resolution than that of Number of Scans, the image data of a Scan subsequent to the final Scan of the set Number of Scans are expanded and also stored in the frame memory 14. As shown in FIGS. 3 through 7, when the quantized DCT coefficients included in the block F4 are divided into four groups and Number of Scans is set as N4, nothing is performed in Step S134. Conversely, when the quantized DCT coefficients are divided into more than four groups or Number of Scans is set as less than N4, the image data of a subsequent Scan, which would be disregarded in Steps S130 and S132, are processed in Step S134.

In Step S136, since the expanded image data now stored in frame memory 14 correspond to an image of higher resolution than the inherent resolution of the LCD 24, it is determined whether or not a part of the expanded image data are to be thinned, thereby producing an enlargement of a part of the original image which may be indicated on the LCD 24. When a part of the image is not to be indicated, this program ends, with. the image corresponding to Number of Scans N1, N2, N3 or N4 being displayed. Conversely, when a part of the image is to be indicated, Step S138 is executed in which the part of the image is designated using a mouse or cursor on the LCD 24, for example. In Step S140, the image data corresponding to the designated part are read from the frame memory 14, thinned, in accordance with a thinning number corresponding to the LCD 24, and stored in the video memory 18, so that the enlarged part of the image is indicated on the LCD 24. Thus, this program ends.

As described above, in the first embodiment, since the display device 22 outputs a recognition pulse, indicating the inherent resolution of the LCD 24, in response to a clock pulse outputted by the CPU 26, the inherent resolution can be easily recognized by the CPU 26. Therefore, the CPU 26 can increment a resolution, with which the image is to be reproduced by the LCD 24, from a lower resolution to a higher resolution, which is lower than or equal to the inherent resolution. As as result, unnecessary image reproduction processing is eliminated, and time wastage is prevented in the reproduction process. Further, if necessary, a part of the image can be enlarged and indicated on the LCD 24.

A second embodiment of the present invention will be described below with reference to FIGS. 15 through 19. An electrical construction of the second embodiment is substantially the same as that shown in FIG. 1 except that the resolution recognition unit 25 is replaced by a gradation recognition unit 25'. The image compression process performed in the image signal processing circuit 13 is similar to that shown in FIG. 2. However, in the second embodiment, a gradation of an image is increased step by step when the image data are successively expanded, as opposed to the resolution of an image being successively increased step by step in the first embodiment.

Figure 15:
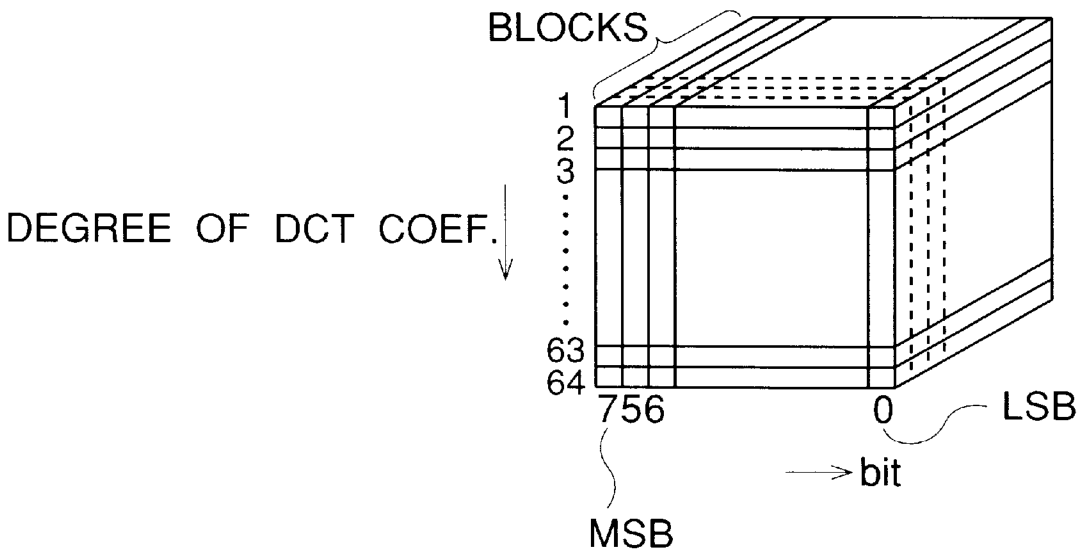
FIG. 15 is a view schematically showing image data contained in all of the Scans, in a second embodiment.
Figure 16:
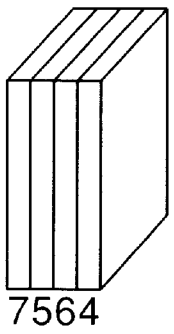
FIG. 16 is a view schematically showing image data contained in Scan (1) of the second embodiment.
Figure 17:
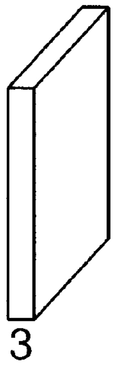
FIG. 17 is a view schematically showing image data contained in Scan (2) of the second embodiment.
Figure 18:
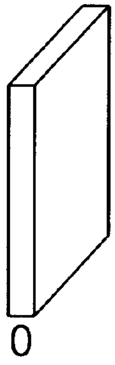
FIG. 18 is a view schematically showing image data contained in Scan (x) of the second embodiment.

The gradation of an image depends upon a number of bits by which the image signal is expressed. For example, as for an 8 bit image signal, the luminance range is divided into 256 ($=2^8$) levels. When an image signal of 8 bits is compressed, the gradation is expressed by an 8-digit binary code. In FIG. 15, the rightmost bit (0) is the least significant bit (LSB), and the leftmost bit (7) is the most significant bit (MSB). The MSB of the DCT coefficient corresponds to the crudest gradation of an image signal, and the LSB of the DCT coefficient corresponds to the finest gradation of an image signal.

In this embodiment, the image signal is treated for each bit. Namely, Scan (1) (see FIG. 3) corresponds to image data obtained by encoding the high-order bits of the DCT coefficients including the MSB. The last Scan (x) corresponds to image data obtained by encoding the low-order bits of the DCT coefficients including the LSB. Namely, the image signal is compressed for each of the bits, with regards to all of the spatial frequencies, from the most significant bit to the least significant bit. Thus, in the second embodiment, a successive approximation system (i.e. s-a system), in which quantized DCT coefficients are encoded sequentially from the MSB to the LSB, is utilized.

When the compressed image signal is reproduced, the image data of Scan (1) are read. Then, the image data, corresponding to only Scan (1) and including the MSB, are expanded, and the expanded image data are stored in the frame memory 14 (see FIG. 1). Thus, the image corresponding to Scan (1) is indicated on the display device 22 (see FIG. 1).

Then, the image data of Scan (2) are expanded, so that the expanded image data corresponding to Scan (2) are stored in the frame memory 14, in addition to the expanded image data of Scan (1). Namely, the image corresponding to Scans (1) and (2), which has a gradation finer than the image corresponding to only Scan (1), is indicated on the display device 22. Thus, when the image data of Scan (x) are expanded, the image having the highest gradation can be obtained.

Here, it is supposed that there are four kinds of LCDs, i.e. a type A, a type B, a type C and a type D, where the gradations of the LCDs of the types A, B, C and D, correspond to 8 bits, 6 bits, 4 bits and 2 bits, respectively. Number of Scans (N1, N2, N3 and N4) for each of the LCDs is determined in accordance with the gradations. Namely, similarly to that shown in FIG. 13, Number of Scans increases in order from N1 to N4, and corresponds to the LCD types D, C, B and A, respectively.

The operation, by which the CPU 26 (see FIG. 1) recognizes the type of the LCD, is the same as that of the first embodiment (see FIGS. 11 and 12). Namely, when the display device 22 is provided with the LCD 24 of the type B, a recognition pulse having a pulse spacing of 3T is outputted from the resolution recognition unit 25 to the CPU 26, in response to a clock pulse outputted by the CPU 26. The CPU 26 recognizes, based on the recognition pulse, that the LCD 24 is of type B, i.e. that the gradation of the LCD 24 is 6 bits, so that Number of Scans N3 is selected by the CPU 26. In the image signal processing circuit 13, image data, to a bit value corresponding to Number of Scans N3, are expanded and stored in the frame memory 14, so that 6 bit expanded image data are produced. Thus, an image signal of one image is recorded in the video memory 18 and is outputted to the LCD controller 21, so that the image is indicated on the LCD 24.

Figure 19:
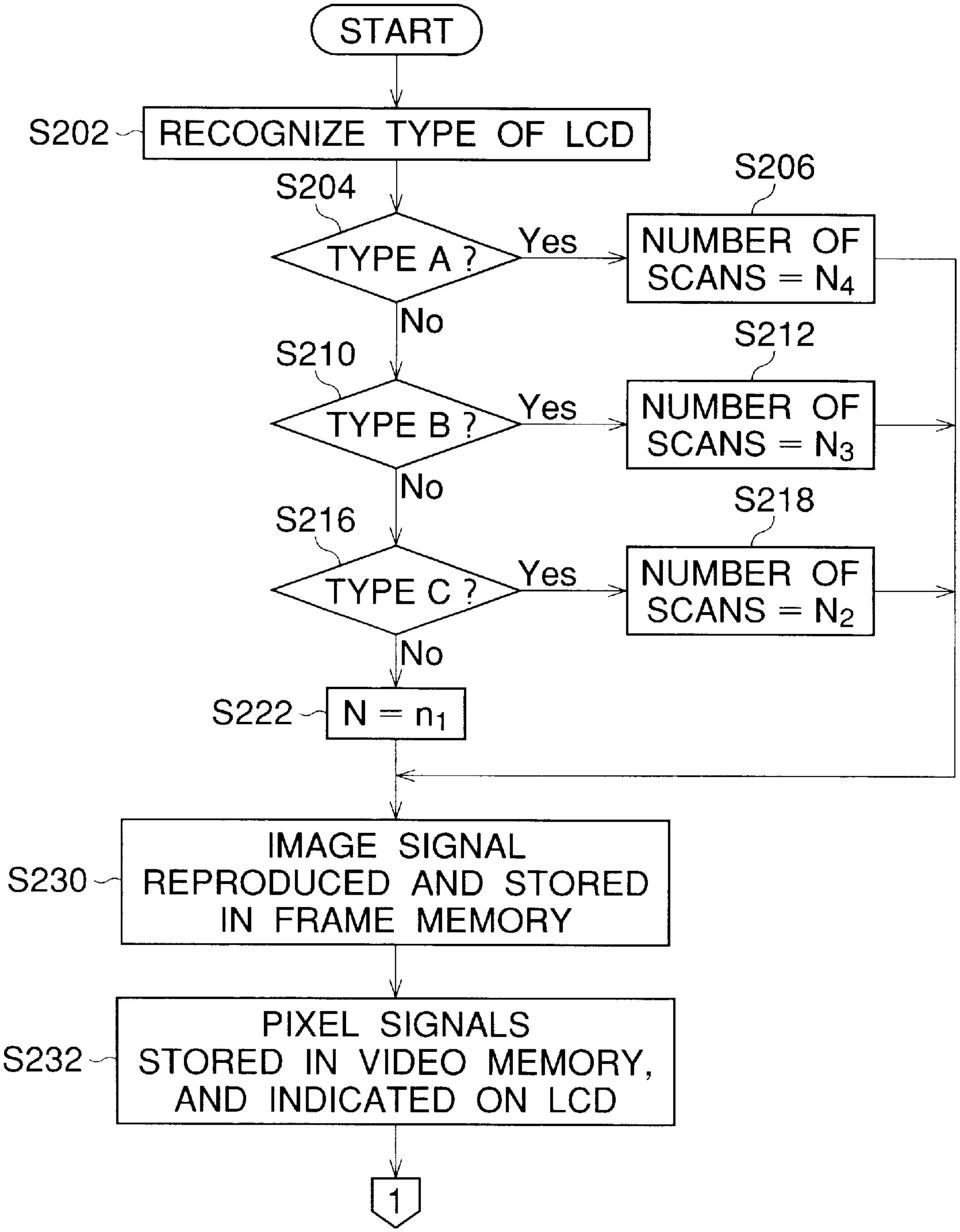
FIG. 19 is a part of a flow chart of an image indicating process by which an image is indicated by the LCD, in the second embodiment.

FIG. 19 shows a flow chart of an image indicating process by which an image is indicated by the LCD 24, the flow chart corresponding to FIG. 14A of the first embodiment. "100" is added to each of the reference numerals corresponding to that of FIG. 14A. The content of each Step is basically the same as that shown in FIG. 14A, except that, in Step S232, pixel signals are not thinned.

Similar to the first embodiment, according to the second embodiment, since the display device 22 outputs a recognition pulse, indicating the inherent gradation of the LCD 24, in response to a clock pulse outputted by the CPU 26, the inherent gradation can be easily recognized by the CPU 26. Therefore, only the image data of the Scans (i.e. Scan (1), Scan (2), . . . Scan (x) of FIGS. 16 through 18) necessary to reproduce the image to the required number of bits or to the maximum number of bits of the LCD 24 can be expanded, and thus, unnecessary image reproduction processing is eliminated, enabling prevention of time wastage in the reproduction process.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-92957 (filed on Mar. 27, 1997) which is expressly incorporated herein, by reference, in its entirety.

What is claimed is:

1. An image signal reproduction device connectible to a plurality of displays, said image signal reproduction device comprising:

an image signal expansion processor for expanding a compressed image signal from a lower resolution to a higher resolution of said image, said image signal expansion processor converting said compressed image signal to a decompressed image signal;

a display connection through which an inherent resolution of a display connectible to the display connection is transmitted from the display to the image signal reproduction device, a plurality of different inherent resolutions being capable of being transmitted via said display connection;

a resolution setting processor that checks the display connection and sets a predetermined resolution lower than or equal to the transmitted inherent resolution; and an image signal reproduction circuit that controls said image signal expansion processor to expand said compressed image signal until a decompression corresponding to said predetermined resolution is reached and reproduces said image at said predetermined resolution so that each display connectible to the display connection, when connected thereto, displays said image at a predetermined resolution lower than or equal to the connected display's inherent resolution.

2. An image signal reproduction device according to claim 1, wherein said compressed image signal is obtained by processing original image data with a discrete cosine transformation, so that the original image data are broken down into spatial frequency components which are DCT coefficients, quantizing said DCT coefficients to generate quantized DCT coefficients, dividing said quantized DCT coefficients into a plurality of groups, and encoding said quantized DCT coefficients for each of said groups.

3. An image signal reproduction device according to claim 2, where in said image signal expansion processor expands said compressed image signal for each of said groups, in such a manner that images are reproduced successively from a low resolution image to a high resolution image.

4. An image signal reproduction device according to claim 1, wherein said display comprises an information output processor outputting information indicating said inherent resolution, and said resolution setting processor recognizes said inherent resolution in accordance with said information transmitted through the display connection.

5. An image signal reproduction device according to claim 4, wherein said resolution setting processor outputs a clock pulse of a constant period, and said information output processor outputs said information in association with said clock pulse.

6. An image signal reproduction device according to claim 1, wherein said display is connected to an electronic camera.

7. An image signal reproduction device connectible to a plurality of displays, said image signal reproduction device comprising:

an image signal expansion processor for expanding a compressed image signal from a lower resolution to a higher resolution of said image, said image signal expansion processor converting said compressed image signal to a decompressed image signal;

a display connection through which a maximum displayable resolution of a display connectible to the display connection is transmitted from the display to the image signal reproduction device, a plurality of different maximum displayable resolutions being capable of being transmitted via said display connection;

a resolution setting processor that checks the display connection and incrementally sets a predetermined resolution lower than or equal to the transmitted maximum displayable resolution; and an image signal reproduction circuit that controls said image signal expansion processor to expand said compressed image signal until a decompression corresponding to said predetermined resolution is reached and reproduces said image at said predetermined resolution so that each display connectible to the display connection, when connected thereto, displays said image at a predetermined resolution lower than or equal to the connected display's maximum displayable resolution.

8. An image signal reproduction device connectible to a plurality of displays, said image signal reproduction device comprising:

an image signal expansion processor for expanding a compressed image signal from a coarser gradation to a finer gradation of said image, said image signal expansion processor converting said compressed image signal to a decompressed image signal;

a display connection through which an inherent gradation of a display connectible to the display connection is transmitted from the display to the image signal reproduction device, a plurality of different inherent gradations being capable of being transmitted via said display connection;

a gradation setting processor that checks the display connection and sets a predetermined gradation coarser than or equal to the transmitted inherent gradation; and an image signal reproduction circuit that stops said expansion by said image signal expansion processor at a step corresponding to said predetermined gradation and reproduces said image at said predetermined gradation so that each display connectible to the display connection, when connected thereto, displays said image at a predetermined gradation coarser than or equal to the connected display's inherent gradation.

9. An image signal reproduction device according to claim 8, wherein said compressed image signal is obtained by processing original image data with a discrete cosine transformation, so that the original image data are broken down into spatial frequency components which are DCT coefficients, quantizing said DCT coefficients to generate quantized DCT coefficients, dividing said quantized DCT coefficients into a plurality of groups, and encoding said quantized DCT coefficients for each of said groups.

10. An image signal reproduction device according to claim 9, wherein said image expansion processor expands said compressed image signal for each of said groups, in such a manner that images are reproduced successively from a crude gradation image to a fine gradation image.

11. An image signal reproduction device according to claim 8, wherein said display comprises an information output processor outputting information indicating said inherent gradation, and said gradation setting processor recognizes said inherent gradation in accordance with said information.

12. An image signal reproduction device according to claim 11, wherein said gradation setting processor outputs a clock pulse of a constant period, and said information output processor outputs said information in association with said clock pulse.

13. An image signal reproduction device according to claim 11, wherein said display is connected to an electronic camera.

14. An image signal reproduction device connectible to a plurality of displays, said image signal reproduction device comprising:

an image signal expansion processor for expanding a compressed image signal from a coarser gradation to a finer gradation of said image, said image signal expansion processor converting said compressed image signal to a decompressed image signal;

a display connection through which a maximum displayable gradation of a display connectible to the display connection is transmitted from the display to the image signal reproduction device, a plurality of different maximum displayable gradations being capable of being transmitted via said display connection;

a gradation setting processor that checks the display connection and incrementally sets a predetermined gradation coarser than or equal to the transmitted maximum displayable gradation; and an image signal reproduction circuit that stops said expansion by said image signal expansion processor at a step corresponding to said predetermined gradation and reproduces said image at said predetermined gradation so that each display connectible to the display connection, when connected thereto, displays said image at a predetermined gradation coarser than or equal to the connected display's maximum displayable gradation.

15. An image signal reproduction system comprising:

a display indicating an image, which is obtained by expanding a compressed image signal, said display including a resolution information outputting processor outputting resolution information which corresponds to resolutions which said display is capable of displaying; and an image signal reproduction device, comprising:

a display connection through which said resolution information is transmitted from the resolution information outputting processor of the display to the image signal reproduction device, a plurality of different resolutions being capable of being transmitted via said resolution information via said display connection;

a resolution selecting processor that checks the display connection and selects one of said resolutions based on said resolution information output by said resolution information outputting processor and transmitted through the display connection;

an image signal expansion processor expanding said compressed image signal, said image signal expansion processor changing the amount of said compressed image signal to be expanded in accordance with the selected resolution by expanding said compressed image signals from a lower resolution to a higher resolution of said image, said image signal expansion processor converting said compressed image signal to a decompressed image signal; and an image signal reproduction circuit that controls said image signal expansion processor to expand said compressed image signal until a decompression corresponding to said selected resolution is reached and reproduces said image at said selected resolution so that the display connected to the display connection displays said image at the selected resolution selected from said resolution information, transmitted through said display connection, which corresponds to said resolutions which said display is capable of displaying.

16. An image signal reproducing device according to claim 15, wherein said image signal expansion processor comprises:

a first image processor generating a reproduced image signal, said first image processor dividing said compressed image signal, which has been obtained by orthogonally-converting a first image signal and arranging the orthogonally-converted image signal in an order depending on spatial frequency, into a plurality of groups from a lower spatial frequency to a higher spatial frequency, and expanding said compressed image signal contained in said groups while changing a number of said groups in accordance with said resolution of said image which can be indicated by said display, so that said reproduced image signal is generated; and a second image processor generating a final image signal, said second image processor thinning a predetermined number of pixels, in accordance with said resolution of said image which can be indicated by said display, from said reproduced image signal, to generate said final image signal, which is indicated by said display.

17. An image signal reproducing device according to claim 16, wherein said first image processor performs an expansion process sequentially from a group corresponding to said lower spatial frequency to a group corresponding to said higher spatial frequency, and, as a resolution of said display decreases, changes the group to which said expansion is performed to the other group corresponding to a lower spatial frequency and decreases the number of said groups to which said expansion is performed.

18. An image signal reproduction system comprising:

a display indicating an image, which is obtained by expanding a compressed image signal, said display including a gradation information outputting processor outputting gradation information which corresponds to gradations which said display is capable of displaying; and an image signal reproduction device, comprising:

a display connection through which said gradations information is transmitted from the gradation information outputting processor in the display to the image signal reproduction device, a plurality of different gradations being capable of being transmitted via said gradation information via said display connection;

a gradation selecting processor that checks the display connection and selects one of said gradations based on said gradation information output by said gradation information outputting processor and transmitted through the display connection;

an image signal expansion processor expanding said compressed image signal, said image signal expansion processor changing the amount of said compressed image signal to be expanded in accordance with the selected gradation by expanding said compressed image signals from a coarser gradation to a finer gradation of said image, said image signal expansion processor converting said compressed image signal to a decompressed image signal; and an image signal reproduction circuit that stops said expansion by said image signal expansion processor at a decompression corresponding to said selected gradation and reproduces said image at said selected gradation so that the display connected to the display connection displays said image at the selected gradation selected from said gradation information, transmitted through said display connection, which corresponds to said gradations which said display is capable of displaying.

19. An image signal reproducing device according to claim 18, wherein said image signal expansion processor comprises:

a first image processor generating a reproduced image signal, said first image processor dividing said compressed image signal, which has been obtained by orthogonally-converting a first image signal and arranging the orthogonally-converted image signal in an order depending on spatial frequency, into a plurality of groups from a lower spatial frequency to a higher spatial frequency, and expanding said compressed image signal contained in said groups while changing a number of said groups in accordance with said gradation of said image which can be indicated by said display, so that said reproduced image signal is generated; and a second image processor generating a final image signal, said second image processor thinning a predetermined number of luminance bits per pixel, in accordance with said gradation of said image which can be indicated by said display, from said reproduced image signal, to generate said final image signal, which is indicated by said display.

20. An image signal reproducing device according to claim 19, wherein said first image processor performs an expansion process sequentially from a group corresponding to said lower spatial frequency to a group corresponding to said higher spatial frequency, and, as a gradation of said display decreases, changes the group to which said expansion is performed to the other group corresponding to a lower spatial frequency and decreases the number of said groups to which said expansion is performed.

21. An image signal reproduction system comprising:

a memory storing a compressed image as a plurality of scans arranged from a lower spatial frequency to a higher spatial frequency, said image having a predetermined image resolution;

a display device outputting at least one predetermined display resolution that said display is capable of displaying and that is less than said predetermined image resolution; and an image signal reproduction device comprising:

a display connection through which the at least one predetermined display resolution, output by the display device, is transmitted from the display device to the image signal reproduction device;

a resolution setting processor that checks the display device and receives said at least one predetermined display resolution output from the display device, said resolution setting processor being capable of checking and receiving a plurality of different display resolutions from the display device;

an image signal expansion processor that reads said at least one predetermined display resolution of said display device output by the display device and transmitted through the display connection and that expands said compressed image signal by expanding a number of scans at least one less than a total number of said plurality of scans, said expanded number of scans being sufficient to form an image of said at least one predetermined display resolution, said image signal expansion processor further converting said expanded number of scans into an image signal of said at least one predetermined display resolution and said display indicating said image signal at said at least one predetermined display resolution, so that the display connected to the display connection displays said image at the received at least one predetermined display resolution, transmitted to said resolution setting processor, that is less than said predetermined image resolution.

22. An image signal reproduction system comprising:

a memory storing a compressed image as a plurality of scans arranged from a lower spatial frequency to a higher spatial frequency, said image having a predetermined image gradation;

a display device outputting at least one predetermined display gradation that said display is capable of displaying and that is less than said predetermined image gradation; and an image signal reproduction device comprising:

a display connection through which the at least one predetermined display gradation, output by the display device, is transmitted from the display device to the image signal reproduction device;

a resolution setting processor that checks the display device and receives said at least one predetermined display gradation output from the display device, said resolution setting processor being capable of checking and receiving a plurality of different display gradations;

an image signal expansion processor that reads said at least one predetermined display gradation of said display device output by the display device and transmitted through the display connection and that expands said compressed image signal by expanding a number of scans at least one less than a total number of said plurality of scans, said expanded number of scans being sufficient to form an image of said at least one predetermined display gradation, said image signal expansion processor further converting said expanded number of scans into an image signal of said at least one predetermined display gradation and said display indicating said image signal at said at least one predetermined display gradation, so that the display connected to the display connection displays said image at the received at least one predetermined display gradation, transmitted to said resolution setting processor, that is less than said predetermined image gradation.

* * * * *